United States Patent
Farritor

(10) Patent No.: US 7,920,984 B2
(45) Date of Patent: Apr. 5, 2011

(54) MEASUREMENT OF VERTICAL TRACK MODULUS USING SPACE CURVES

(75) Inventor: Shane Michael Farritor, Lincoln, NE (US)

(73) Assignee: Board of Regents of the University of Nebraska, Lincoln, NE (US)

(*) Notice: Subject to any disclaimer, the term of this patent is extended or adjusted under 35 U.S.C. 154(b) by 68 days.

(21) Appl. No.: 12/049,805

(22) Filed: Mar. 17, 2008

(65) Prior Publication Data

US 2008/0228436 A1 Sep. 18, 2008

Related U.S. Application Data

(60) Provisional application No. 60/894,983, filed on Mar. 15, 2007.

(51) Int. Cl.
*G01C 22/00* (2006.01)
*G01B 11/14* (2006.01)

(52) U.S. Cl. ........................... 702/150; 356/614

(58) Field of Classification Search .................. 702/150; 356/614; 73/81; 701/49; 280/407
See application file for complete search history.

(56) References Cited

U.S. PATENT DOCUMENTS

| | | | |
|---|---|---|---|
| 4,010,636 A | 3/1977 | Clark et al. | |
| 4,283,953 A | 8/1981 | Plona | |
| 4,435,984 A | 3/1984 | Gruber | |
| 5,020,371 A | 6/1991 | Panetti | |
| 5,335,184 A | 8/1994 | Hildebrand | |
| 5,341,683 A | 8/1994 | Searle | |
| 5,386,727 A | 2/1995 | Searle | |
| 5,390,544 A | 2/1995 | Madras | |
| 5,721,685 A | 2/1998 | Holland et al. | |
| 5,753,808 A * | 5/1998 | Johnson ........................ 73/146 |
| 6,044,698 A | 4/2000 | Bryan | |
| 6,119,353 A | 9/2000 | Gronskov | |
| 6,430,875 B1 * | 8/2002 | Clark et al. ...................... 49/360 |
| 6,647,891 B2 | 11/2003 | Holmes et al. | |
| 6,742,392 B2 | 6/2004 | Gilmore et al. | |
| 7,403,296 B2 * | 7/2008 | Farritor et al. ................. 356/614 |
| 7,755,774 B2 | 7/2010 | Farritor et al. | |
| 2004/0003662 A1 | 1/2004 | Kenderian et al. | |
| 2005/0072236 A1 | 4/2005 | Heyman et al. | |
| 2006/0136152 A1 | 6/2006 | Takahashi | |
| 2008/0228436 A1 | 9/2008 | Farritor | |
| 2009/0070064 A1 | 3/2009 | Farritor et al. | |

FOREIGN PATENT DOCUMENTS

JP 07174643 7/1995

(Continued)

OTHER PUBLICATIONS

Arnold, R. et al. "Measurement of Vertical Track Modulus From a Moving Railcar," Proceedings of the AREMA 2006 Annual Conference, Louisville, KY, Sep. 17, 2006.

(Continued)

*Primary Examiner* — Bryan Bui
(74) *Attorney, Agent, or Firm* — Faegre & Benson LLP

(57) ABSTRACT

An on-board, non-contact measurement system and method is disclosed for measuring track quality, vertical track stiffness and vertical track modulus for a portion of track underlying the rail vehicle. The system comprises two or more position sensors for determining the position profile of the track and a computation system for determining the vertical displacement of the track.

21 Claims, 9 Drawing Sheets

FOREIGN PATENT DOCUMENTS

SU            1801844        3/1993

OTHER PUBLICATIONS

Lu, S. et al., "On the Relationship Between Load and Deflection in Railroad Track Structure," Proceedings of the AREMA 2008 Annual Conference, Salt Lake City, UT, Sep. 21, 2008.

Lu, Sheng et al., "Exception Criteria in Vertical Track Deflection and Modulus", 2007 ASME/IEEE Joint Rail Conference & Internal Combustion Engine Spring Technical Conference, Mar. 13, 2007, Pueblo, CO USA, 12 pages.

* cited by examiner

US 7,920,984 B2

MEASUREMENT OF VERTICAL TRACK MODULUS USING SPACE CURVES

CROSS-REFERENCE TO RELATED APPLICATIONS

This application claims the benefit of U.S. Provisional Application Ser. No. 60/894,983, filed on Mar. 15, 2007, which is incorporated herein by reference.

STATEMENT REGARDING FEDERALLY SPONSORED RESEARCH OR DEVELOPMENT

This application is funded by Federal Railroad Administration Grant No. DTFR 53-04-G-00011; UNL Account No. (WBS No.) 25-1105-006-002; Principal Investigator Dr. Shane Farritor, et al. The government has certain rights in the invention.

TECHNICAL FIELD

The invention relates generally to methods and apparatus for surface modulus measurement and, more particularly, to methods and apparatus for noncontact, onboard, vertical track modulus measurement.

BACKGROUND OF THE INVENTION

The quality of a railroad track is a major factor in railroad safety. One accepted indicator of track quality is the rail's vertical track modulus. As such, it is important to accurately determine the vertical track modulus in a manner that does not interfere with other transportation needs.

SUMMARY OF THE INVENTION

Embodiments of the present invention relate to systems and methods for determining a relative vertical displacement of a railroad track between two points with different loads, determining track modulus and track stiffness, and determining the quality of the track. Two or more position sensors are attached to one or more rail vehicles having two or more different load profiles. Each position sensor determines at least one position profile of the track. In one embodiment, a position sensor can determine a position profile by measuring a vertical acceleration and integrating the acceleration twice to determine the position profile of the track. Thereafter, the relative displacement between two position profiles of the track is measured.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Embodiments are described in detail below with reference to the attached drawing figures, wherein.

DETAILED DESCRIPTION OF THE INVENTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
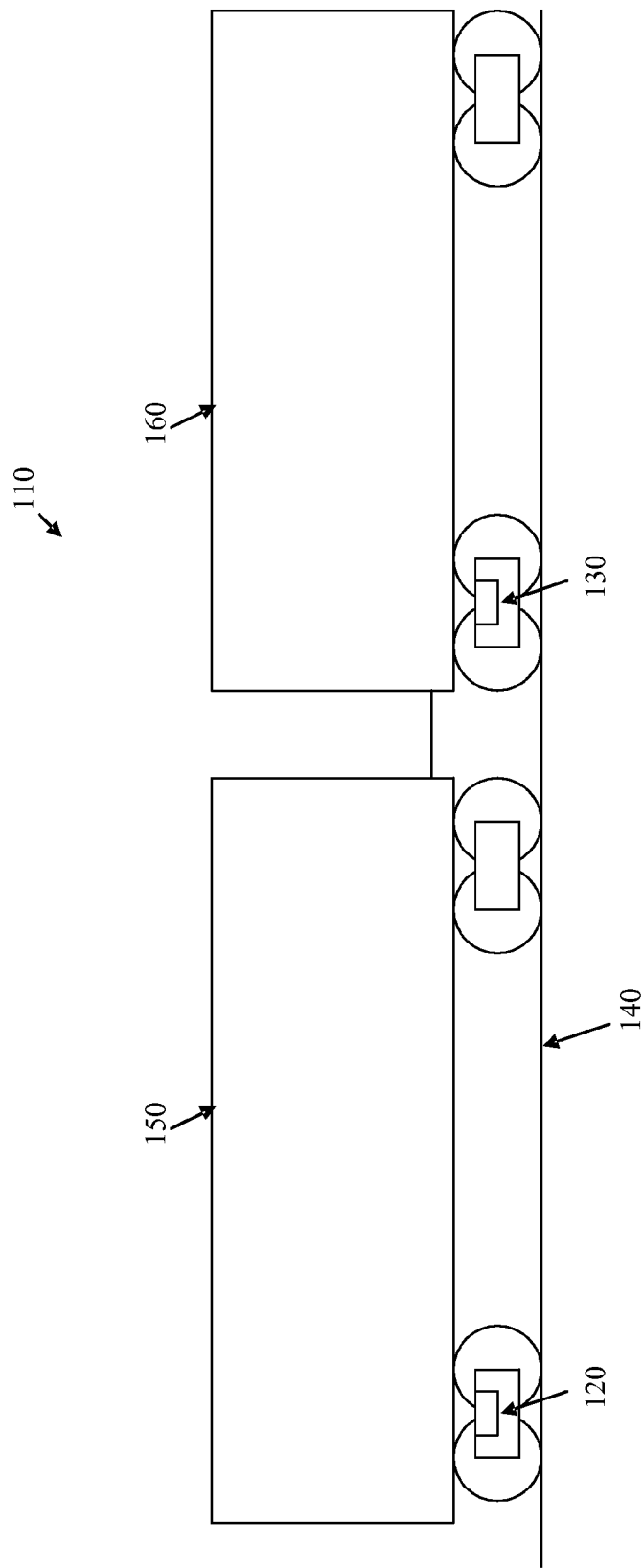
FIG. 1 is an illustration of one embodiment an on-board, non-contact measurement system of the present invention.

Referring to the drawings in general, and initially to FIG. 1 in particular, an exemplary on-board, non-contact measurement system is shown and designated generally as system 110. System 110 is but one example of a suitable computing environment and is not intended to suggest any limitation as to the scope of use or functionality of the invention. Neither should system 110 be interpreted as having any dependency or requirement relating to any one or combination of components illustrated.

The system 110 measures relative vertical track displacement of a railroad track based, in part, on two position profiles, i.e., space curves. Such relative measurements are combined with an analytical model of the track structure and measured vehicle loads (e.g., weight and dynamic forces) to estimate a vertical track modulus and track stiffness for the track. Vertical track stiffness refers to the ratio of applied load to displacement. A railway track has several components that can contribute to track stiffness including, for example, a rail, subgrade, ballast, subballast, ties, and fasteners. The rail directly supports the train wheels. Such a rail is supported on a rail pad and stabilized with fasteners coupled with crossties. The crossties rest on a layer of rock ballast and subballast such that drainage can occur. The soil below the subballast is referred to as a subgrade.

Track modulus refers to a supporting force per unit length of rail per unit rail deflection. Stated differently, track modulus refers to a coefficient of proportionality between a vertical rail deflection and a vertical contact pressure between the rail base and track foundation. In some embodiments, vertical track modulus does not include the effects of a rail. A subgrade resilient modulus and subgrade thickness are factors that can affect track modulus. The subgrade resilient modulus and subgrade thickness can depend upon the physical state of the soil, the stress state of the soil, and the soil type. Generally, track modulus may increase in instances where subgrade resilient modulus increases. In instances where the subgrade layer thickness increases, the track modulus generally decreases.

In addition, ballast layer thickness and fastener stiffness are also features that can affect track modulus. For example, increasing the thickness of the ballast layer may increase track modulus. Similarly, increasing fastener stiffness might also increase track modulus. Such an increase in track modulus can be caused by the load being spread over a larger area. In some cases, it may be desirable to measure a net effective track modulus. In such a case, each of the factors (e.g., subgrade resilient modulus, subgrade thickness, ballast layer thickness, and fastener stiffness) might be utilized to measure the net effective track modulus.

Track modulus can affect track performance and/or maintenance requirements. In some instances, a low track modulus and large variations in track modulus are undesirable. A low track modulus can cause differential settlement that might increase maintenance needs. Large variations in track modulus, such as variations often found near bridges and crossings, can increase dynamic loading. An increase in dynamic loading can reduce the quality of track components and, thereby, result in shorter maintenance cycles. One skilled in the art will appreciate that reducing variations in track modulus at grade (i.e. road) crossings can lead to an enhanced track performance and reduced track maintenance. Ride quality, as indicated by vertical acceleration, can also be dependent, at least in part, on track modulus.

As higher-speed rail vehicles are oftentimes utilized to address economic constraints of both passenger and freight rail services, an enhanced performance of high-speed trains is beneficial. The performance of high-speed trains can also depend on track modulus. For example, at high speeds, there can be an increase in track deflection caused by larger dynamic forces. Such forces become significant as rail vehicles reach 50 km/hr. One skilled in the art will appreciate that a track with a high and consistent modulus may allow for higher train speeds and an increase in performance and revenue.

To identify portions of a track with reduced performance, measurements of low-track modulus, variable-track modulus, void deflection, variable total deflection, and inconsistent rail deflection can be used. Such measurements are oftentimes expensive. In addition, the measurements are generally made over short distances, such as tens of meters.

Accordingly, a vertical track modulus measurement system is oftentimes desirable such that poor performance can be determined over large sections of a track. In some instances, a trackside measurement approach is utilized to obtain a vertical track modulus. With the trackside approach, a section of track is closed to rail traffic, and a work crew uses specialized equipment to make measurements at various discrete locations. Using the trackside approach, rail deflection can be measured before and after a static "point" load is applied. The trackside approach can include a Beam on Elastic Foundation method and/or a Deflection Basin method.

The Beam on an Elastic Foundation method uses a structural model, such as the Winkler Model, to represent the track system. The Winkler model represents a point load applied to an infinite Bernoulli beam on an infinite elastic foundation Trackside measurements of the deflection at the point where the load is applied are taken for a known load. A track modulus can then be calculated using the following equation:

$$u = \frac{1}{4}\left(\frac{1}{EI}\right)^{\frac{1}{3}}\left(\frac{P}{w_0}\right)^{\frac{4}{3}} \tag{1}$$

where:
  u is the track modulus
  E is the modulus of elasticity of the rail
  I is the moment of inertia of the rail
  P is the load applied to the track
  $w_0$ is the deflection of the rail at the loading point The Beam on an Elastic Foundation method can use a single measurement. Such a method can provide information for a single point along the rail. In some cases where multiple loads are present, as with multi-axle railway vehicles used to apply the point load, small deflections can be assumed and superposition may be needed. In such cases, an iterative solution can be utilized, rather than simplifying the Winkler model, as in Equation (1). Because slack in the rail can cause nonlinearity in the load/deflection relationship, a small load can be applied to determine the zero displacement position for the measurement. Thereafter, a heavy load can be applied and used as a loaded measurement.

The second trackside method, the Deflection Basin Method, uses a vertical equilibrium of a loaded rail to determine track modulus. In this approach, rail deflection caused by one or more point loads is measured at multiple locations along the rail. The entire deflected "area" can be calculated. Using a force balance, the deflected area, or deflection basin, can be shown to be proportional to the integral of the rail deflection:

$$P = \int_{-\infty}^{\infty} q(x)dx = \int_{-\infty}^{\infty} u\delta(x)dx = uA_\delta \tag{2}$$

where:
  P is the load on the track
  q(x) is the vertical supporting force per unit length
  u is the track modulus
  $\delta(x)$ is the vertical rail deflection
  $A_\delta$ is the deflection basin area (area between the original and deflected rail positions)
  x is the longitudinal distance along the track The multiple deflection measurements result in longer traffic delays. Similar to the Beam on an Elastic Foundation method, both heavy and light loads can be used to eliminate slack, which may further increase delays.

Such trackside measurement methods (e.g., Beam on an Elastic Foundation method and Deflection Basin method) can be time consuming and expensive. In addition, a track modulus measured using the trackside measurement methods might be valid for a small length of track.

Accordingly, it is desirable to use an on-board modulus measurement system for determining a vertical track modulus. On-board measurements are made from a moving rail car. As such, on-board measurements can be made with less interruption of rail traffic and over longer distances.

In some cases, on-board systems are labor intensive and move at slow speeds. Thus, such on-board systems might be limited to short distances (e.g. hundreds of meters) and may still interrupt traffic. Such on-board systems use a long, rigid truss that rides on two unloaded wheels. The truss creates a straight line, or cord, that is used as a reference for the measurement. A third wheel may then be used to apply a load at midpoint of the cord (or truss), and the relative displacement between the loaded wheel and the unloaded truss can be measured. The truss should be long enough, generally 30.48 m (100 ft), so that the two endpoints are not affected by the load at the center of the truss. Such an on-board system requires two measurements (e.g., one with a light load, made with a similar truss, and the heavy load) to distinguish between changes in geometry and changes in modulus. The relative displacement of the loaded wheel with respect to the unloaded wheel can be measured and, thereafter, the track modulus can be estimated.

One vehicle, called the Track Loading Vehicle (TLV), uses such an on-board approach. This vehicle is capable of measuring track modulus at speeds of 16.1 km/hr (10 mph). The TLV uses two cars, each with a center load bogie capable of applying loads from 4.45 kN to 267 kN (1 to 60 kips). A light load (13.3 kN or 3 kips) can be applied by the first vehicle while a heavier load is applied by the second vehicle. A laser-based system on each vehicle measures the deflections of the rail caused by the center load bogies. The test procedure involves two passes over a section of track (e.g., first applying a 44.5 kN (10 kip) load and then a 178 kN (40 kip) load). Using the TLV, tests are often performed at speeds below 16.1 km/hr (10 mph) and, accordingly, it is difficult to test long section of track (hundreds of miles). In addition, a significant expense for both equipment and personnel is incurred for operation.

Figure 2:
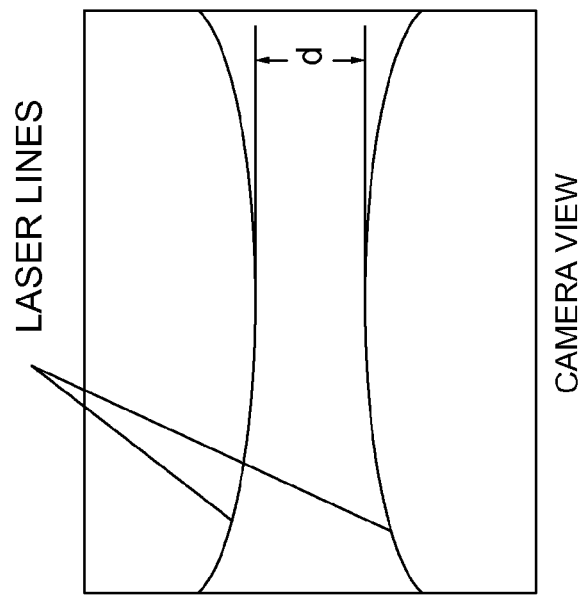
FIG. 2 is a schematic of the modulus measurement system mounted to a train showing an exemplary embodiment of a recent system.
Figure 2:
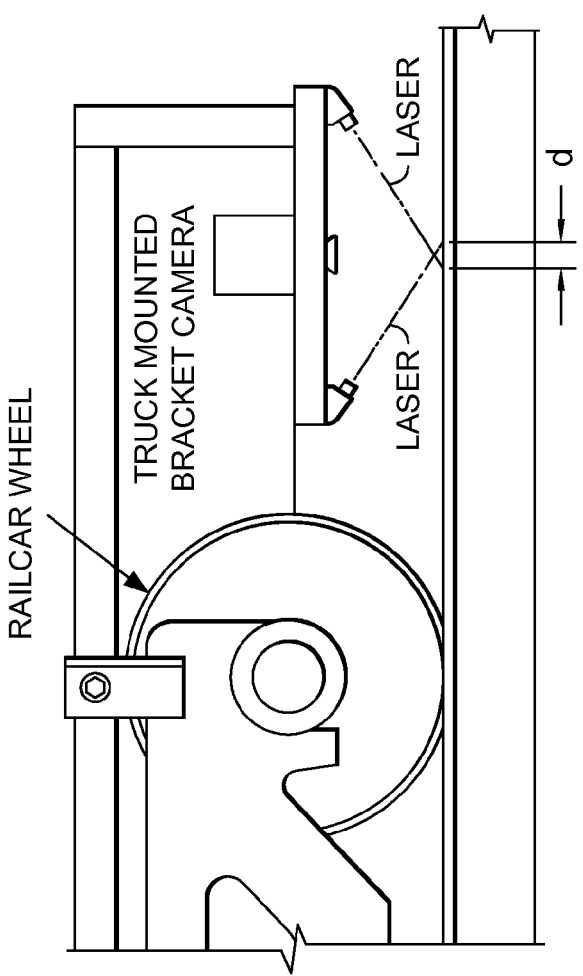
Figure 3:
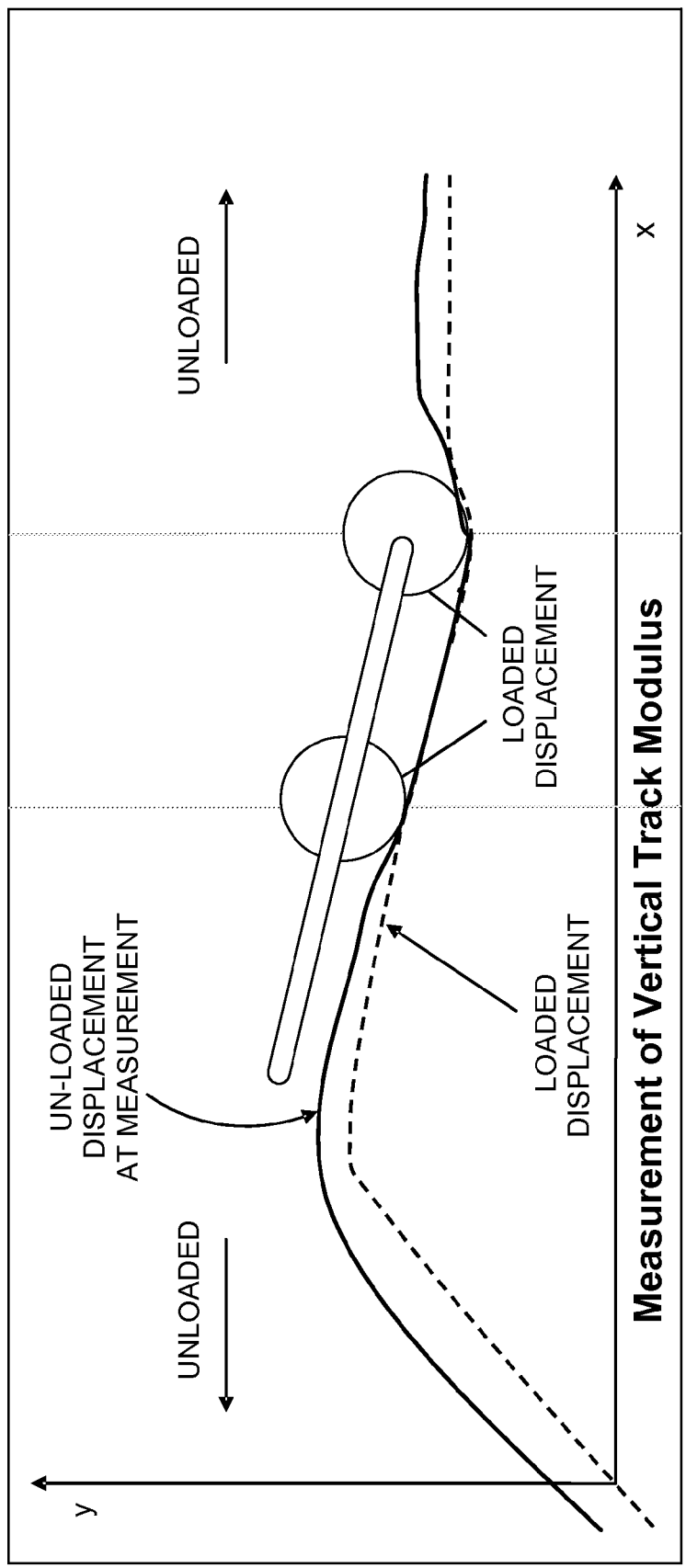
FIG. 3 is an illustration of a recent system measurement of vertical track modulus.

A track modulus may be determined from a moving railcar that operates at higher speeds. The more recent systems are used to measure the relative displacement of a railroad track between a loaded point and an unloaded point, determine the quality of the track, and determine vertical track modulus and vertical track stiffness. Such systems use a rail vehicle having each wheel engage the rail at a wheel and rail contact point. A mechanism is used to measure the vertical displacement of the track at a distance along the rail spaced from one of the wheel and rail contact points. The sensor system includes a digital vision system and two line lasers, as shown in FIG. 2 and FIG. 3. The camera and line lasers are rigidly attached to a bracket mounted to the sideframe (i.e., a structure member that connects axles) of a truck (i.e., two-axle assembly). The lasers are projected at an acute angle, such as 30°. The lasers cross and create curves across the surface of the rail. On softer track, the rail may rise relative to the wheel and rail contact point, and the laser lines, as observed by the camera, may move closer together. Conversely, the distance between the lasers may increase on stiffer track. The minimum distance between these lines, d, can be related mathematically to the track modulus. Using line lasers allows the system to compensate for lateral movement of the rail relative to the camera and for changes in rail profile. This system measures the relative displacement based on the relative displacement between an unloaded point and the line created by the two wheel contact points on a given truck. Upon measuring the relative displacement, the vertical track modulus can be estimated.

Figure 4:
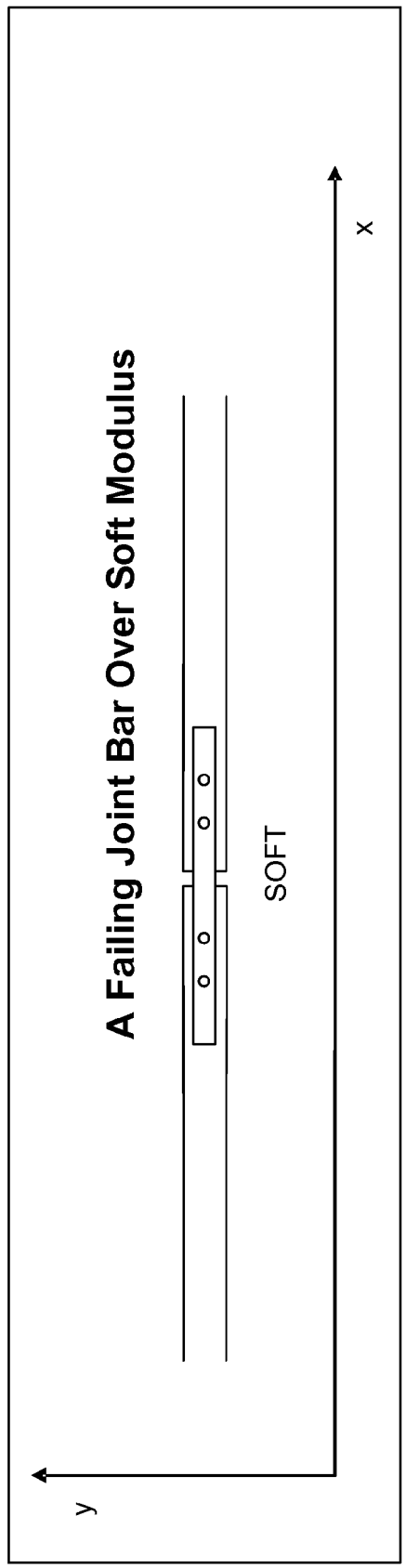
FIG. 4 is an illustration of a failing joint bar over soft modulus.
Figure 5:
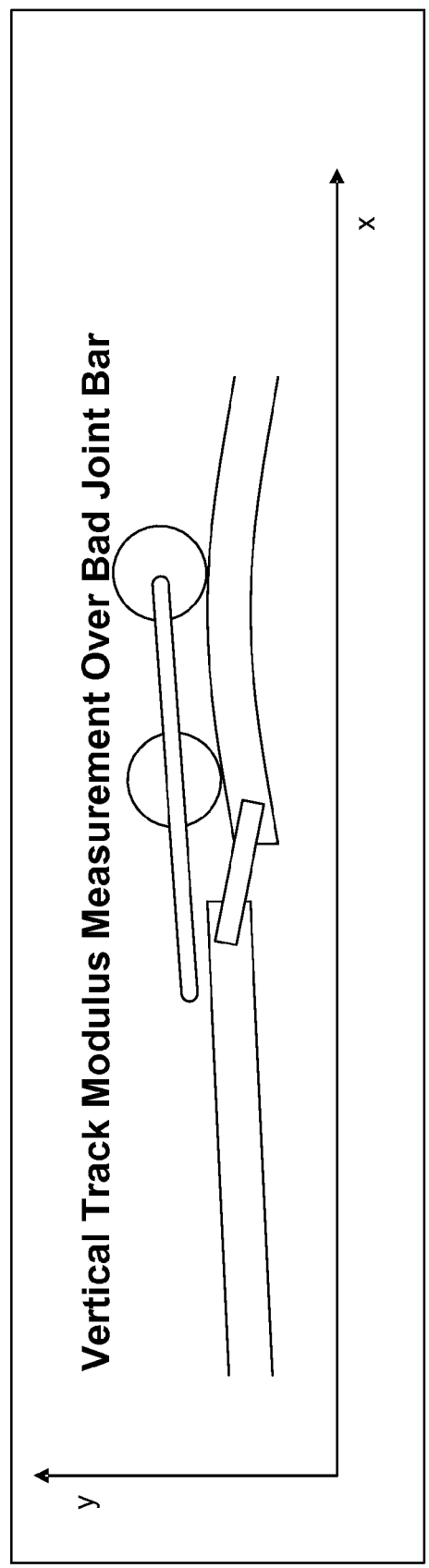
FIG. 5 is an illustration of a measurement of a vertical track modulus over a bad joint bar.
Figure 6:
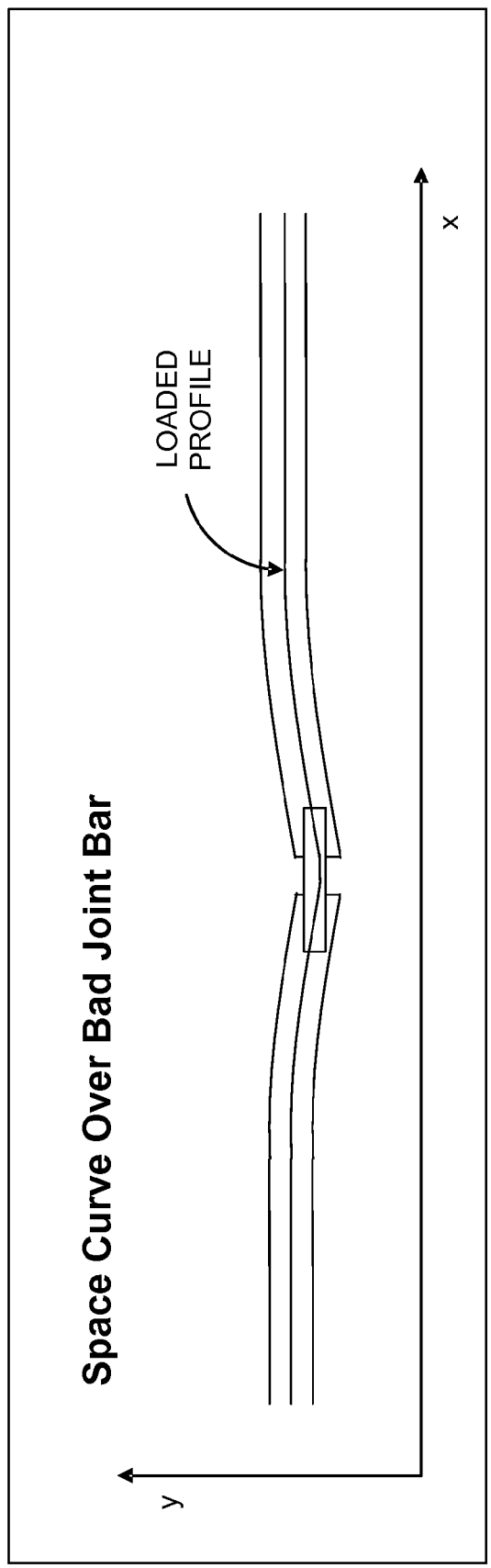
FIG. 6 is an illustration of a space curve over a bad joint bar.

Such a system is useful in situations where there is a weak joint bar over a soft spot (e.g., low modulus), as shown in FIG. 4. The weak joint bar can cause the low modulus or the low modulus can cause the weak joint bar. The weak joint bar and the low modulus may also be unrelated and may be accompanied by a geometry problem. As shown in FIG. 5, this system also compares the loaded end of the rail with a measurement of the relative displacement across the joint bar and, therefore, may find weaknesses in the track that can cause derailments. By contrast, as shown in FIG. 6, a system using space curves provides small displacements and, accordingly, may not find weaknesses in the track that can cause derailments. For example, assume a long section of perfectly uniform track with a low modulus is compared to a long section of uniform track with a high modulus. A space curve measurement might reveal a straight curve, whereas the system of FIG. 5 might show a difference in relative displacement that can show the modulus.

A patent application publication, US 2006/0144129 (hereinafter the '129 patent publication), disclosing such a system used to measure the relative displacement of a railroad track between a loaded point and an unloaded point is attached to the present nonprovisional application and is hereby incorporated by reference. The present nonprovisional application and the '129 patent publication have the same assignee and share a common inventor. In addition, three papers entitled "Measurement of Vertical Track Modulus From a Moving Railcar," "On the Relationship Between Load and Deflection in Railroad Track Structure," and "Exception Criteria in Vertical Track Deflection and Modulus" are also attached to the present nonprovisional application and are hereby incorporated by reference.

Referring again to FIG. 1, the system 110 comprises a first position sensor 120 and a second position sensor 130 for determining the position profile of a track 140 and a computation system (not shown) for determining the vertical displacement of the track. The first position sensor 120 is attached to rail vehicle 150. The second position sensor 130 is attached to rail vehicle 160. Position sensors 120 and 130 may be attached to the truck of a rail vehicle, a wheel of a rail vehicle, or another component of a rail vehicle. In embodiments where position sensors are mounted to the truck of a rail vehicle, a bracket mounted to a side frame of the truck may be utilized. Regardless of whether a position sensor is attached to the wheel, truck, or other component of a rail vehicle, position sensors 120 and 130 may be mounted vertically, horizontally, or in an alternative orientation.

In one embodiment, two position sensors, such as first position sensor 120 and second position sensor 130, are utilized to determine position profiles of a track. One skilled in the art will recognize that a plurality of position sensors may be utilized to determine position profiles of a track. The two or more attached position sensors are positioned near varying vertical loads. In one embodiment, one rail vehicle may have varying vertical loads. Accordingly, in such an embodiment, two or more position sensors may be attached to one rail vehicle. Alternatively, the two or more position sensors may be attached to separate rail vehicles with each rail vehicle having a different vertical load, e.g., a heavy vertical load and a light vertical load. In such an embodiment, a leading or trailing rail vehicle may be loaded with more or less weight.

Figure 7:
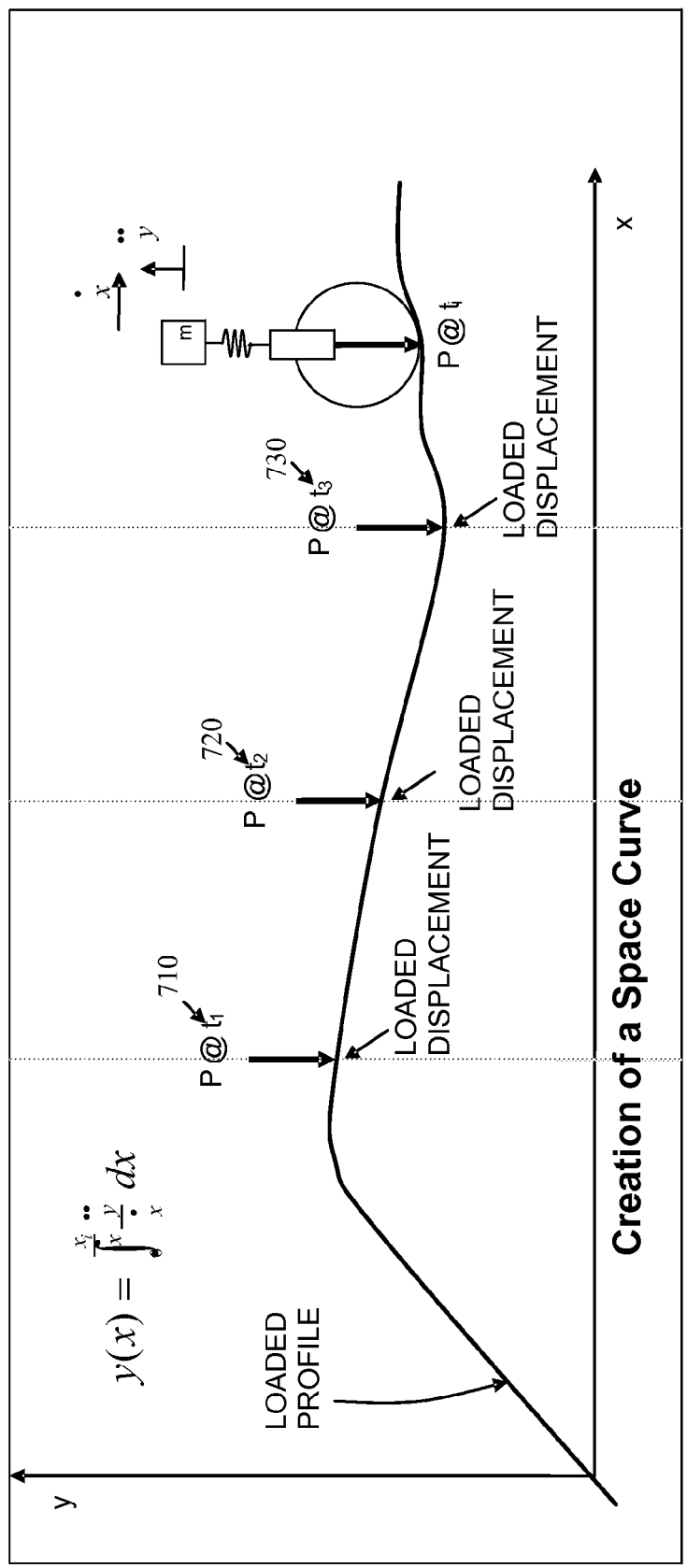
FIG. 7 is an illustration of the creation of a position profile.

As previously mentioned, position sensors 120 and 130 determine at least one position profile of track 140. In one embodiment, position sensors 120 and 130 include an Inertial Measurement Unit or accelerometer. In such an embodiment, to determine a position profile of the track, a position sensor attached to a moving rail vehicle can measure the vertical acceleration, among other accelerations. In some embodiments, the position sensor may not measure an acceleration until the rail vehicle reaches a sufficient speed. With data regarding the time of the measurements and the distance traveled along the tracks, the measured vertical acceleration may be integrated twice to determine the position profile of the track. FIG. 7 illustrates a position profile at a first time 710, a position profile at a second time 720, and a position profile at a third time 730.

The distance traveled along the tracks can be determined by a global positioning system (GPS), an odometer, or other similar device that can be used to measure distances. In an embodiment utilizing an odometer, the odometer may be mounted such that it is observed and its measurements recorded by a camera. In an embodiment utilizing a global positioning system, automatic image geocoding may be used to attach GPS localization to the images. The automatic image geocoding may be done through a GPS receiver plug-in for the camera. The date, time and GPS stamps may be permanent, non-modifiable, intrinsic information that is attached as pixels into the digital images.

Figure 8:
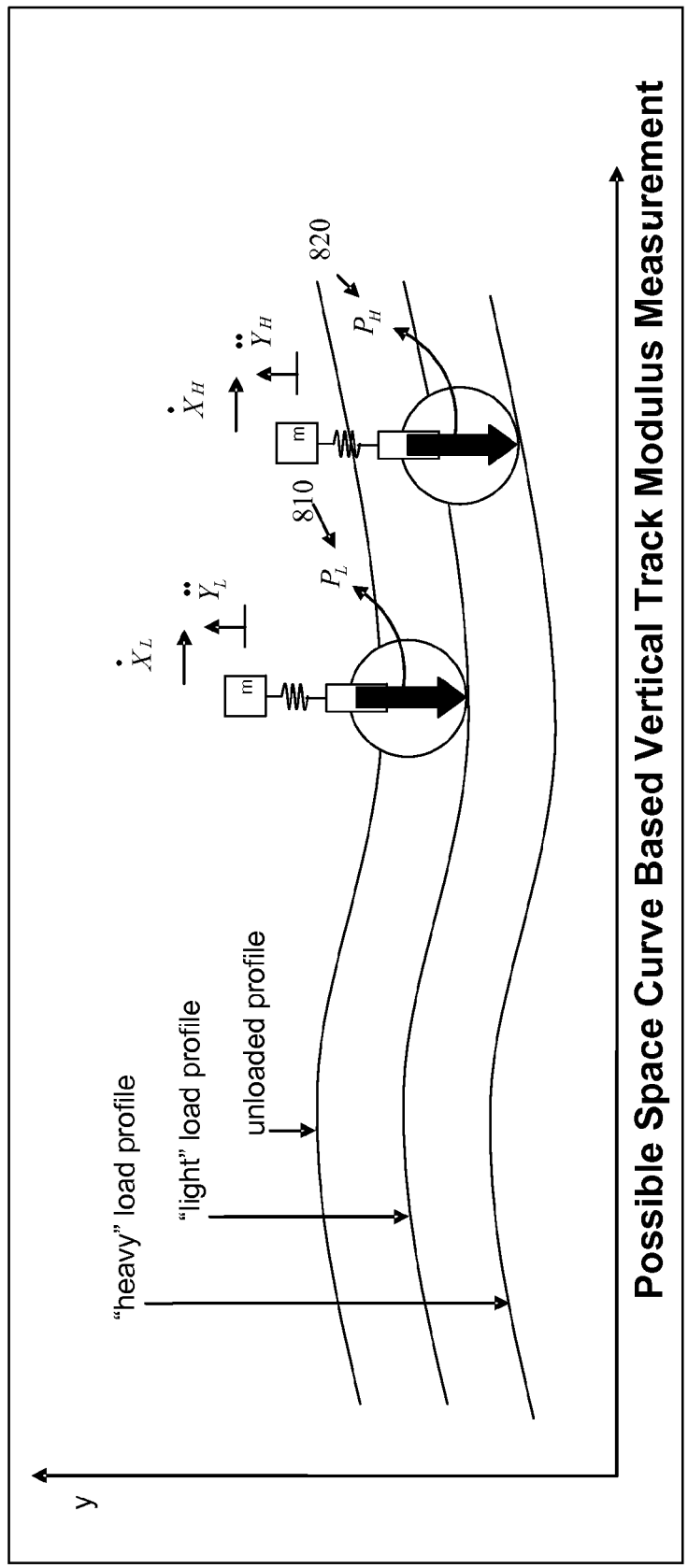
FIG. 8 is an illustration of one embodiment of a position profile based on a vertical track modulus measurement.

The computation system (not shown) determines the vertical displacement between position profiles determined by first position sensor 120 and second position sensor 130. For example, with reference to FIG. 8, the computation system determines the vertical distance between the "light" vertical load 810 and the "heavy" vertical load 820. In some embodiments, to determine vertical displacement, the position of each truck is measured with respect to the vehicle body. In such a case, a relative measurement may then be made using two position profiles and the measured position of each truck with respect to the vehicle body. The computation system may comprise hardware, software, or a combination thereof.

Upon determining the vertical displacement between two position profiles, a vertical track modulus may then be estimated. A mathematical model can be used to calculate the track modulus based on the relative displacement between two position profiles determined by position sensors. For example, the Winkler model, the discrete support (crosstie) model, and the nonlinear stiffness model may be utilized to estimate a vertical track modulus. Such models assume data regarding the rail's elastic modulus and cross-sectional geometry, which may be commonly available.

In addition, upon determining the vertical displacement between two position profiles, in one embodiment, the present invention may be used in conjunction with the on-board system that utilizes a loaded and unloaded point, as described in the '129 patent publication incorporated by reference, to extract changes in geometry from changes in modulus. In such an embodiment, the on-board system described in the '129 patent publication can more accurately measure vertical track modulus.

In one embodiment of the present invention, the system further comprises a computer system to perform one or more aspects of the invention, e.g., store data or perform calculations for particular aspects. The computer system may operate automatically or upon receiving user input to execute or save. In embodiments where the computer system operates automatically, the computer may store data or perform calculations continuously or at predetermined instances.

The memory for storing data may represent the random access memory (RAM) devices comprising the main storage of the respective computer, as well as any supplemental levels of memory, e.g., cache memories, non-volatile or backup memories (e.g., programmable or flash memories), read-only memories, etc. In addition, each memory may be considered to include memory storage physically located elsewhere in a respective computer, e.g., any cache memory, or any storage capacity used as a virtual memory such as in a mass storage device.

The processor may represent one or more processors, e.g., microprocessors. The processor operates under the control of an operating system, and executes or otherwise relies upon various computer software applications, components, programs, objects, modules, data structures, etc. In an embodiment where a computer system is utilized to perform one or more aspects of the invention, accelerations, time of measurements, distance traveled along the tracks, position profiles, vertical load, vertical displacements, vertical track modulus, or a combination thereof may be calculated and stored.

Figure 9:
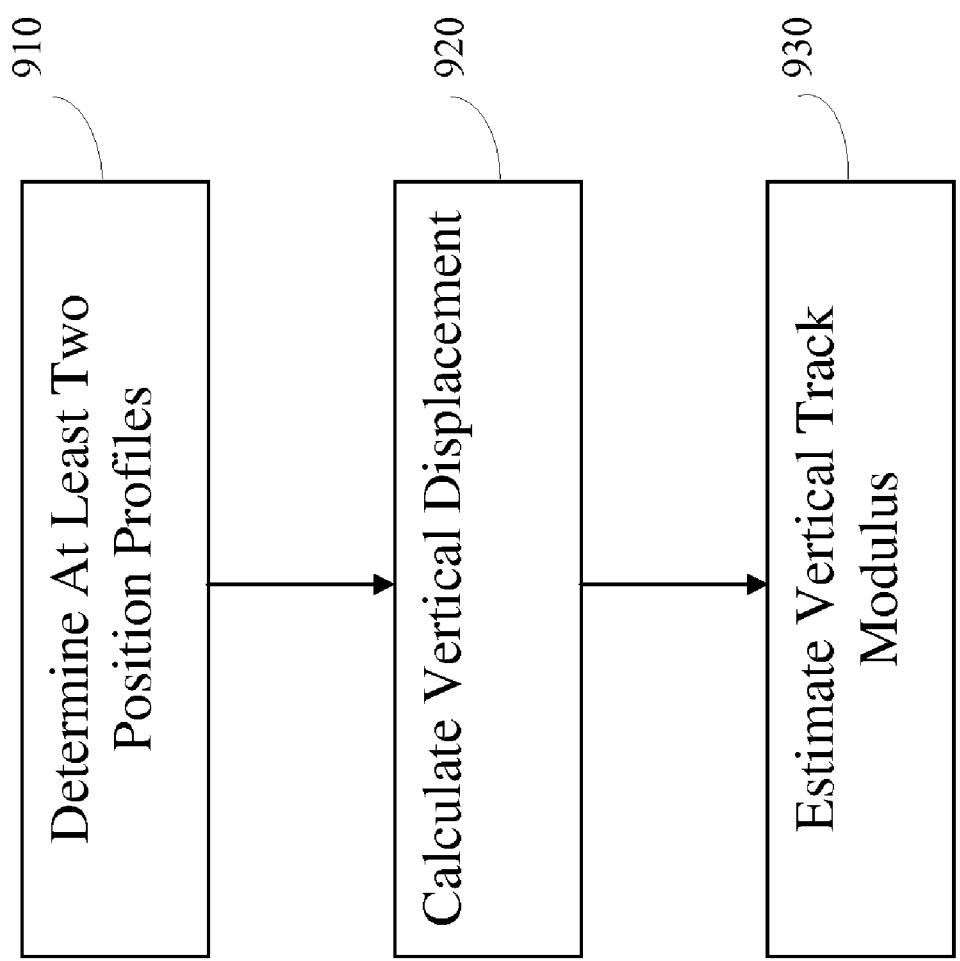
FIG. 9 is a flow diagram illustrating an exemplary method for measuring the relative displacement of a railroad track.

Turning now to FIG. 9, a flow diagram is provided illustrating an exemplary method 900 for measuring the relative displacement of a railroad track. At block 910, two or more profile positions are determined. Each profile position may be determined by a separate position sensor that is attached to a moving rail vehicle. As previously mentioned, in one embodiment, the position sensor measures the vertical acceleration of the moving rail vehicle and integrates the acceleration twice to determine the position profile of the track. To achieve two or more profile positions, one skilled in the art will appreciate that one rail vehicle having two or more vertical loads may be utilized, two or more rail vehicles have varied vertical loads may be utilized, or a position sensor may be run over the track two or more times. One skilled in the art will further appreciate that measurements may be made at times, days, weeks, months, or even years apart, which may be advantageous to analyzing the trend behavior of a track modulus.

The vertical displacement between the two or more profile positions determined at block 910 is calculated at block 920. At block 930, the vertical track modulus is estimated based on the vertical displacement calculated at block 920. The vertical track modulus may be estimated using a mathematical model such as the Winkler model, the discrete support (crosstie) model, or the nonlinear stiffness model.

Track performance may be measured over time to permit potentially improved prediction of future track behavior. Measurements may be made, for example, at intervals of three months, and these measurements may be used to measure the trend of track performance. Of course, one of ordinary skill in the art will appreciate that other measurement intervals, both longer and shorter than three months, may be used without departing from the scope of the present invention. Accordingly, a measurement made at a first time and a measurement made at a second time may be used to predict track properties at a time subsequent to both the first time and the second time.

For the purpose of such a trending analysis it may be desirable to remove both offsets so that relative comparisons can be made over short sections of track. The relative comparisons would evaluate one measurement relative to a previous measurement made at the same location at an earlier time.

To remove the measurement offset (Yrel) an average may be taken over a distance, such as 0.1 miles, of track. The difference between the two average measurements may then be added to each data point in the lower measurement to effectively shift the data in the vertical direction.

To remove the offset in milepost the cross correlation function may be introduced to mathematically quantify the offset. Cross correlation is a standard method of estimating the degree correlation between two sets of measurements. Consider two series x(i) and y(i) both of length N where i=0, 1, 2 ... N−1. The cross correlation $\hat{R}_{xy}$ at delay m is defined as:

$$\hat{R}_{xy}(m) = \frac{1}{N}\sum_{n=0}^{N-1} x(n)y(n+m), \text{ where}$$

$$m = -(N-1), \ldots, -2, -1, 0, 1, 2, \ldots, N-1$$

For various values of m, $\hat{R}_{xy}$ is in the range $-1 \leq \hat{R}_{xy} \leq 1$. The bounds, −1 and 1, indicate maximum correlation and 0 indicates no correlation. A high negative correlation indicates a high correlation but where one series is the inverse of the other series.

A line or other curve may be fitted to the collected trend data to predict future track performance. Collected data may be from a first time and a second time, or may be from any number of times. Such an approach can predict at what point in the future track performance may fall outside of acceptable parameters.

It is to be understood that the specific embodiments of the present invention that are described herein are merely illustrative of certain applications of the principles of the present invention. It will be appreciated that, although an exemplary embodiment of the present invention has been described in detail for purposes of illustration, various modifications may be made without departing from the spirit and scope of the invention. Therefore, the invention is not to be limited except as by the appended claims.

What is claimed is:

1. A system for measuring a relative vertical displacement of a railroad track using two or more position sensors, the system comprising:
   at least one rail vehicle having a rail body and a set of wheels, at least one wheel of the set of wheels engaging the rail;
   a first position sensor attached to a first rail vehicle having a first vertical load, wherein the first position sensor determines a first position profile of the first rail vehicle;
   a second position sensor attached to a second rail vehicle having a second vertical load, wherein the second position sensor determines a second position profile of the second rail vehicle; and
   a computation system for determining the relative vertical displacement of the track, wherein the first position profile and the second position profile are used to determine the relative vertical displacement of the track.

2. The system of claim 1 further comprising a vertical track modulus component for determining the vertical track modulus for a particular portion of the rail based on the vertical displacement of the track for that particular portion of the rail.

3. The system of claim 1 wherein each position sensor comprises:
   an accelerometer that measures a vertical acceleration measurement of the first rail vehicle; and
   a calculating component to calculate the position profile of the at least one rail vehicle based upon the measured acceleration.

4. The system of claim 3 wherein the first position profile and the second position profile are calculated by utilizing a time of the measurement and a distance traveled along the tracks to integrate the vertical acceleration measurement twice.

5. The system of claim 1 wherein the first rail vehicle is the second rail vehicle.

6. The system of claim 1 further comprising an odometer.

7. The system of claim 1 further comprising automatic image geocoding.

8. The system of claim 2 wherein a computer processor having software that runs a Winkler model determines the track modulus for a particular portion of the track.

9. The system of claim 2 wherein a computer processor having software that runs a discrete support model determines the track modulus for a particular portion of the track.

10. The system of claim of claim 2 wherein a computer processor having software that runs a nonlinear track stiffness model determines the track modulus for a particular portion of the track.

11. A noncontact method for measuring a relative displacement of a railroad track using two or more position sensors, the method comprising the steps of:
    determining two or more profile positions, wherein the two or more profile positions are determined by a first position sensor attached to a moving rail vehicle having a first vertical load and a second position sensor attached to a moving rail vehicle having a second vertical load; and
    comparing the two or more profile positions to determine the relative displacement of the railroad track.

12. The method of claim 11 further comprising calculating a vertical track modulus, vertical track stiffness, or a combination thereof, based on the relative displacement.

13. The method of claim 11 wherein the position sensors measure vertical acceleration.

14. The method of claim 13, wherein the position sensors integrate the measured vertical acceleration twice to determine the two or more position profiles.

15. A method for measuring a relative vertical displacement of a railroad track portion using two or more position sensors attached to at least one rail vehicle having a rail body and a set of wheels engaging the railroad track, the method comprising:
    determining a first position profile of a first rail vehicle having a first vertical load, wherein a first position sensor determines the first position profile;
    determining a second position profile of a second rail vehicle having a second vertical load, wherein a second position sensor determines the second position profile;
    calculating the relative vertical displacement of the railroad track portion, wherein the first position profile and the second position profile are used to calculate the relative vertical displacement of the railroad track portion; and
    based on the vertical displacement of the railroad track portion, determining a vertical track modulus for the railroad track portion.

16. The method of claim 15, wherein the first position sensor and the second position sensor comprise an accelerometer that measures a vertical acceleration for the first rail vehicle and the second rail vehicle.

17. The method of claim 16 further comprising calculating the first position profile utilizing the measured vertical acceleration of the first rail vehicle and calculating the second position profile utilizing the measured vertical acceleration of the second rail vehicle.

18. The method of claim 15 further comprising utilizing a discrete support model to determine the vertical track modulus for the railroad track portion.

19. The method of claim 15 further comprising utilizing a nonlinear track stiffness model to determine the vertical track modulus for the railroad track portion.

20. The method of claim 15 further comprising utilizing a Winkler model to determine the vertical track modulus for the railroad track portion.

21. A non-contact method for measuring a relative displacement of a railroad track using one or more position sensors, the method comprising the steps of:
    determining a first profile position at a first time using a first position sensor attached to a first moving rail vehicle;
    determining a second profile position at a second time using a second position sensor attached to a second moving rail vehicle;
    fitting a curve to the first profile position and the second profile position; and
    predicting a profile position at a time subsequent to the first time and the second time using the curve.

* * * * *